United States Patent
Ellerich et al.

(10) Patent No.: US 9,610,863 B2
(45) Date of Patent: Apr. 4, 2017

(54) VEHICLE SEAT

(71) Applicant: Johnson Controls Components GmbH & Co. KG, Kaiserslautern (DE)

(72) Inventors: Frank Ellerich, Bennhausen (DE); Eckhard Spies, Enkenbach-Alsenborn (DE)

(73) Assignee: Johnson Controls Components GmbH & Co. KG, Kaiserlautern (DE)

( * ) Notice: Subject to any disclaimer, the term of this patent is extended or adjusted under 35 U.S.C. 154(b) by 292 days.

(21) Appl. No.: 14/382,904

(22) PCT Filed: Mar. 22, 2013

(86) PCT No.: PCT/EP2013/056014
§ 371 (c)(1),
(2) Date: Sep. 4, 2014

(87) PCT Pub. No.: WO2013/143984
PCT Pub. Date: Oct. 3, 2013

(65) Prior Publication Data
US 2015/0021965 A1  Jan. 22, 2015

(30) Foreign Application Priority Data
Mar. 31, 2012  (DE) .................. 10 2012 006 687

(51) Int. Cl.
*B60N 2/02* (2006.01)
*B60N 2/68* (2006.01)
(Continued)

(52) U.S. Cl.
CPC ....... *B60N 2/0284* (2013.01); *B60N 2/01566* (2013.01); *B60N 2/162* (2013.01); *B60N 2/682* (2013.01)

(58) Field of Classification Search
CPC .. B60N 2/0284; B60N 2/01566; B60N 2/162; B60N 2/682
(Continued)

(56) References Cited

U.S. PATENT DOCUMENTS 2,601,213 A  6/1952  Poupitch
2,620,539 A  12/1952  Poupitch
(Continued)

FOREIGN PATENT DOCUMENTS

CH  243 423 A  7/1946
DE  20 2004 018224 U1  2/2005
(Continued)

*Primary Examiner* — Anthony D Barfield
(74) *Attorney, Agent, or Firm* — McGlew and Tuttle, P.C.

(57) ABSTRACT

A vehicle seat (1), in particular a utility vehicle seat, includes a first seat part and second seat part which can be displaced in the longitudinal direction relative to the first seat part in order to set the seat depth. At least one slider (50), which is connected to the first seat part, is provided. The slider (50) projects with a connecting region (56), embodied in the manner of a head, through a guide slot (60) which is provided in the second seat part. In order to attach the slider (50) to the first seat part, an anchoring element (70), which is embodied as a separate part and is composed of metal, is provided. The anchoring element (70) projects through the slider (50) and through the first seat part and connects the slider (50) to the first seat part in a positively locking fashion.

11 Claims, 4 Drawing Sheets

(51) Int. Cl.
*B60N 2/015* (2006.01)
*B60N 2/16* (2006.01)

(58) Field of Classification Search
USPC .............................................. 297/337, 344.1
See application file for complete search history.

(56) References Cited

U.S. PATENT DOCUMENTS

| | | | |
|---|---|---|---|
| 2,789,842 A | | 4/1957 | Lief |
| 3,101,218 A | | 8/1963 | Baermann |
| 3,328,085 A | | 6/1967 | Schwartz et al. |
| 4,114,947 A | * | 9/1978 | Nelson ............... B60N 2/01558 297/344.1 |
| 6,299,120 B1 | * | 10/2001 | Girardi .............. B60N 2/01541 297/344.1 |
| 2006/0110235 A1 | | 5/2006 | Dembowsky et al. |
| 2007/0018047 A1 | | 1/2007 | Wodak |
| 2007/0290116 A1 | | 12/2007 | Lambert et al. |
| 2010/0108808 A1 | | 5/2010 | Allain et al. |
| 2012/0001467 A1 | | 1/2012 | Teufel et al. |

FOREIGN PATENT DOCUMENTS

| | | | | |
|---|---|---|---|---|
| DE | 10 2005 033048 B3 | 1/2007 | | |
| DE | 10 2006 056 859 B3 | 3/2008 | | |
| DE | 10 2009 040461 B3 | 2/2011 | | |
| DE | 20 2011 104663 U1 | 9/2011 | | |
| EP | 0 813 990 A2 | 12/1997 | | |
| EP | 2 412 569 A1 | 2/2012 | | |
| FR | 2864481 A1 | * | 7/2005 | ......... B60N 2/01566 |
| GB | 1 560 234 A | 1/1980 | | |
| JP | 2006 109970 A | 4/2006 | | |
| JP | 2007-512169 A | 5/2007 | | |
| WO | 2005/051701 A2 | 6/2005 | | |
| WO | 2008/052269 A1 | 5/2008 | | |
| WO | 2008/101531 A1 | 8/2008 | | |
| WO | 2008/140752 A1 | 11/2008 | | |
| WO | 2013/143984 A1 | 10/2013 | | |

* cited by examiner

VEHICLE SEAT

CROSS REFERENCE TO RELATED APPLICATIONS

This application is a United States National Phase Application of International Application PCT/EP2013/056014 filed Mar. 22, 2013 and claims the benefit of priority under 35 U.S.C. §119 of German Patent Application DE 10 2012 006 687.2 filed Mar. 31, 2012, the entire contents of which are incorporated herein by reference.

FIELD OF THE INVENTION

The invention relates to a vehicle seat with adjustable seat depth, in particular a utility vehicle seat, having a first seat part and a second seat part which is displaceable in the longitudinal direction relative to the first seat part in order to adjust the seat depth, wherein at least one slider is provided, which is connected to the first seat part and protrudes with a head-shaped connection area through a guide slot provided in the second seat part.

BACKGROUND OF THE INVENTION

DE 20 2011 104 663 U1 discloses a vehicle seat of the type in question, of which the seat depth is adjustable.

For this purpose, the vehicle seat has a first seat part designed as a seat frame and a second seat part designed as a seat shell or as a seat bucket, the seat bucket being displaceable relative to the seat frame in the longitudinal direction. By means of such a displacement of the seat shell relative to the seat frame, the seat depth of the vehicle seat, that is to say the length of the seat surface located in front of the backrest in the direction of travel, is adjustable.

A slider is mounted on the seat frame, which slider protrudes with a head-shaped connection area through a guide slot, the latter being provided in the seat shell and extending in the longitudinal direction.

For securing it on the seat frame, the slider for this purpose has a connection area formed in one piece with the slider.

SUMMARY OF THE INVENTION

An object of the invention is to improve a vehicle seat of the aforementioned type, in particular to increase the strength of the sliders.

A vehicle seat of the type in question, in particular a utility vehicle seat, comprises a first seat part and a second seat part which is displaceable in the longitudinal direction relative to the first seat part in order to adjust the seat depth, wherein at least one slider is provided, which is connected to the first seat part and protrudes with a head-shaped connection area through a guide slot provided in the second seat part.

According to the invention, in order to secure the slider on the first seat part, an anchoring element, which is designed as a separate part and is made of metal, is provided, which anchoring element protrudes through the slider and through the first seat part and establishes a form-fit connection of the slider to the first seat part. The anchoring element is therefore not designed in one piece with the slider but instead as a separate part distinct from the latter.

The strength of the slider, particularly when loaded in the vertical direction, is greatly increased by the inventive arrangement of an anchoring element. In particular, the danger of the second seat part coming loose from the first seat part in the event of a crash is reduced. The degree of strength is particularly high on account of the anchoring element being made of metal.

The first seat part is preferably a seat frame connected to an upper frame or to a scissors-type stand of the vehicle seat. The second seat part is preferably a seat shell, which carries a seat cushion. In order to adjust the seat depth, the seat shell with the seat cushion is thus movable relative to the sliders and also relative to a backrest of the vehicle seat.

The anchoring element is preferably designed in one piece, as a result of which its production and assembly are relatively simple.

It has been found that designing the anchoring element as a zinc die-cast part is particularly advantageous, since in this way production is simple and inexpensive, at the same time with a high degree of strength.

According to an advantageous embodiment of the invention, the anchoring element has a plate-shaped holding area, which bears on the connection area of the slider. This ensures a secure form-fit connection of the anchoring element to the slider in the vertical direction.

A relatively rigid form-fit and force-fit connection between the slider and the anchoring element can be obtained if at least one claw of the anchoring element deforms at least one support area of the slider, in particular if the claw deforms the support area plastically. This in particular increases the safety against twisting of the anchoring element relative to the slider about an axis extending in the vertical direction. Moreover, production-related tolerances of the slider and of the anchoring element can thus be compensated.

The connection area advantageously has a through-opening into which the anchoring element is fitted, wherein several support areas, preferably four support areas, are arranged around the through-opening.

If several claws, again preferably four claws, are arranged on the holding area in such a way that each of the claws deforms one of the support areas, then the safety against twisting of the anchoring element relative to the slider is further increased and the tolerance compensation between anchoring element and slider is symmetrical.

Advantageously, the anchoring element also has a securing area, which is inserted through a central opening in the first seat part and interacts with the first seat part. This also ensures a secure form-fit connection of the anchoring element to the first seat part in the vertical direction.

The securing area preferably has a cuboid shape, by which a relatively high degree of strength can be achieved.

The slider can be mounted on the first seat part particularly easily if the form-fit connection of the slider to the first seat part can be established by rotating the anchoring element through approximately 90° relative to the first seat part. This rotation of the anchoring element preferably takes place about an axis extending in the vertical direction.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
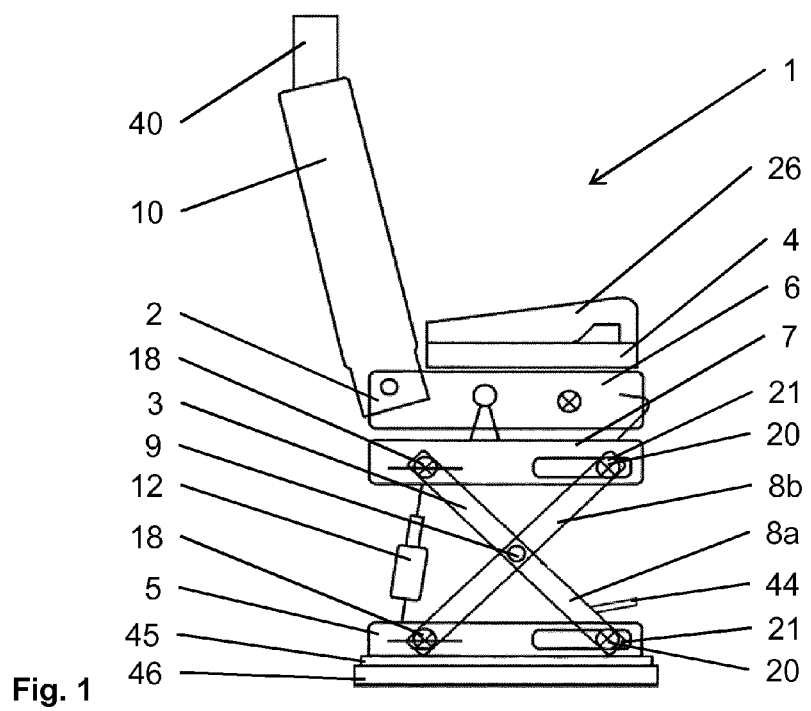
FIG. 1 is a schematic view of a vehicle seat.
Figure 2:
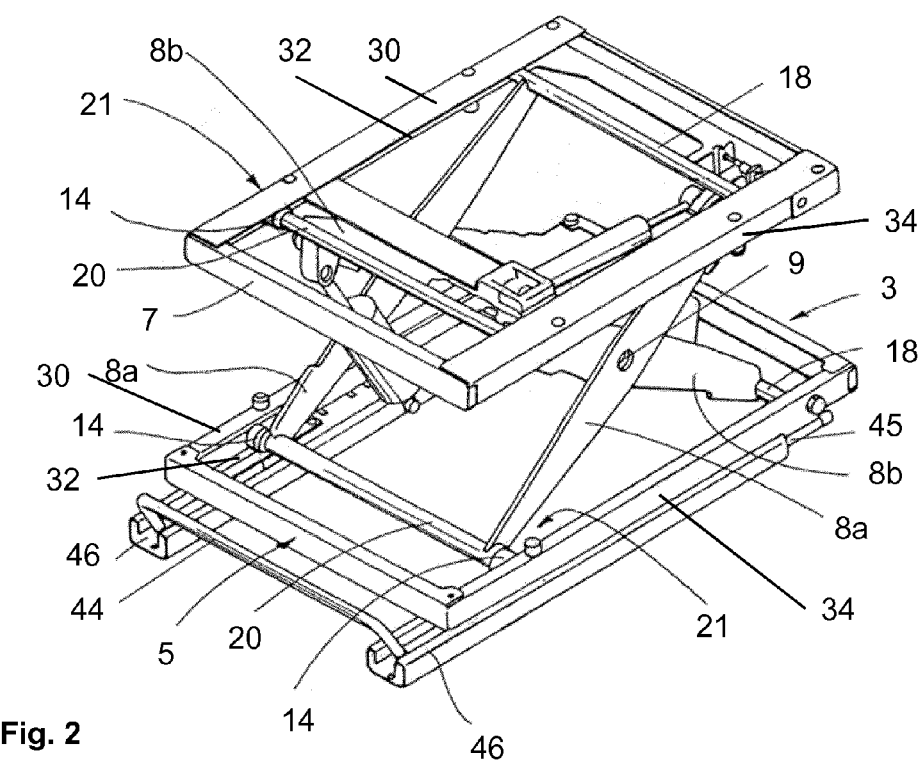
FIG. 2 is a perspective view of a vehicle seat without seat part and without backrest.
Figure 3:
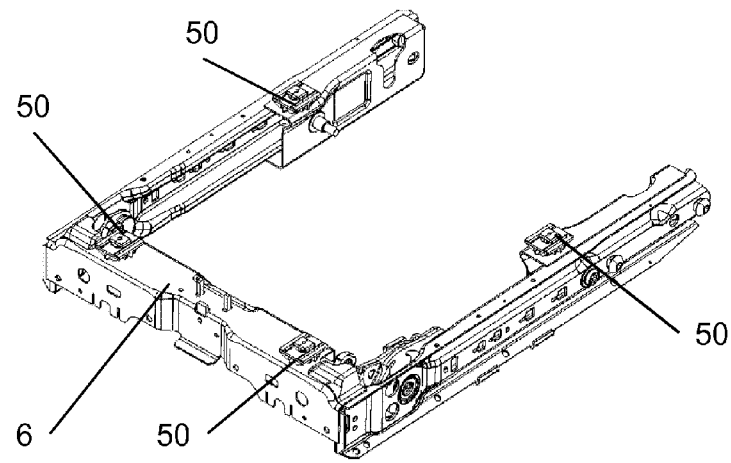
FIG. 3 is a seat frame of a vehicle seat.
Figure 4:
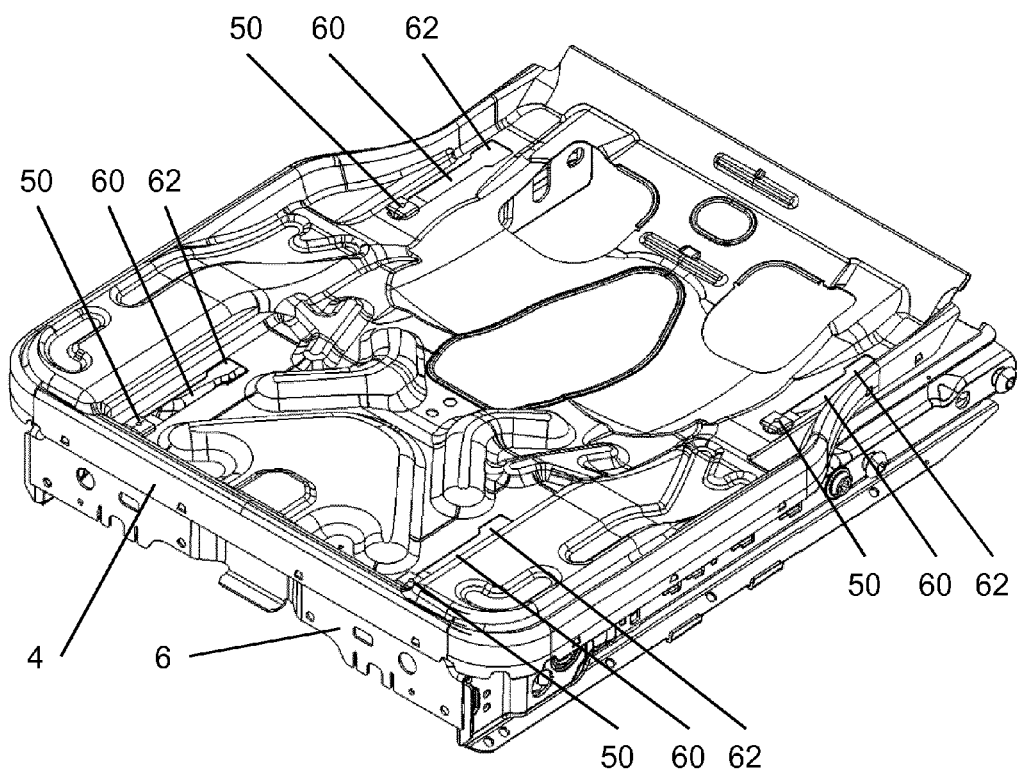
FIG. 4 is a seat frame with attached seat shell.
Figure 5:
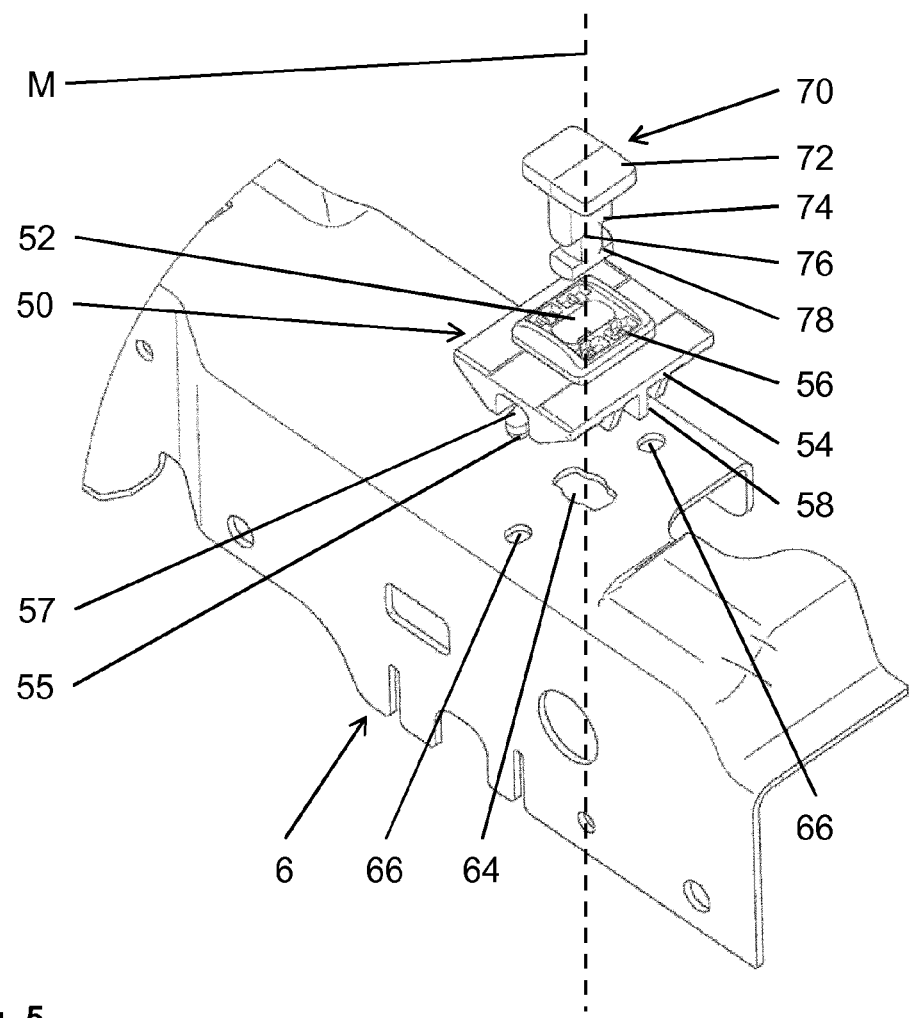
FIG. 5 is an exploded view of seat frame, slider and anchoring element.
Figure 6:
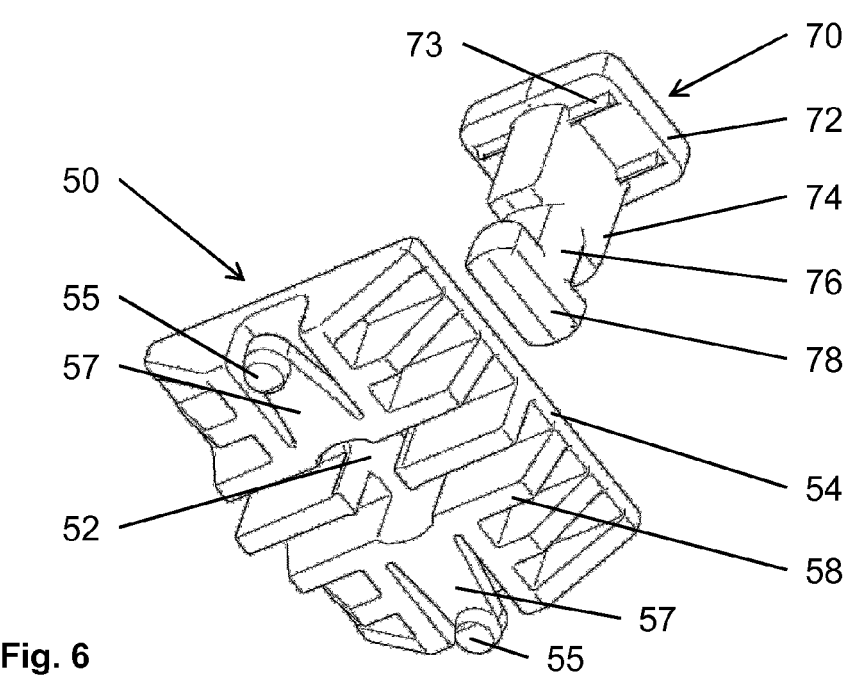
FIG. 6 is a view according to FIG. 5 from another perspective without seat frame.
Figure 7:
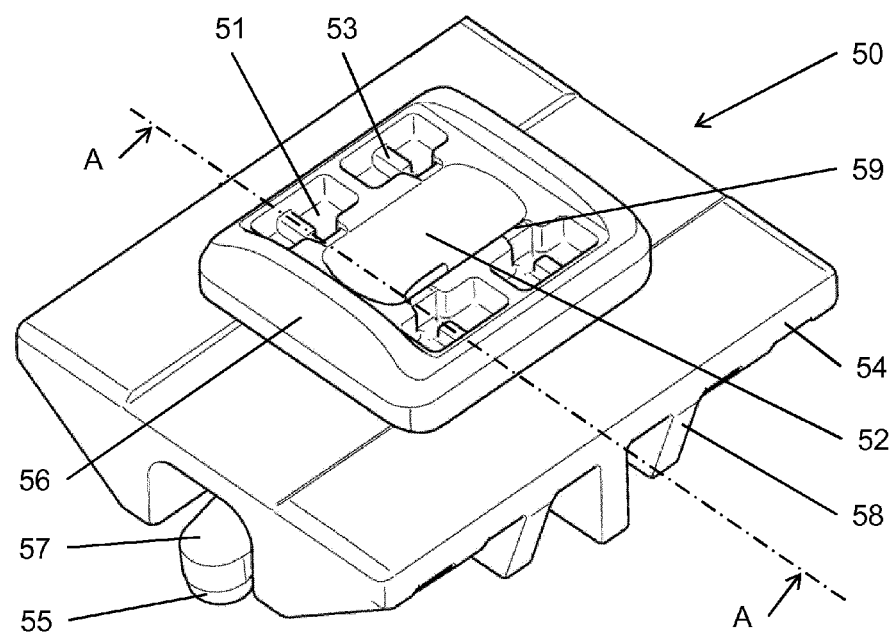
FIG. 7 is an enlarged view of the slider from FIG. 5.
Figure 8:
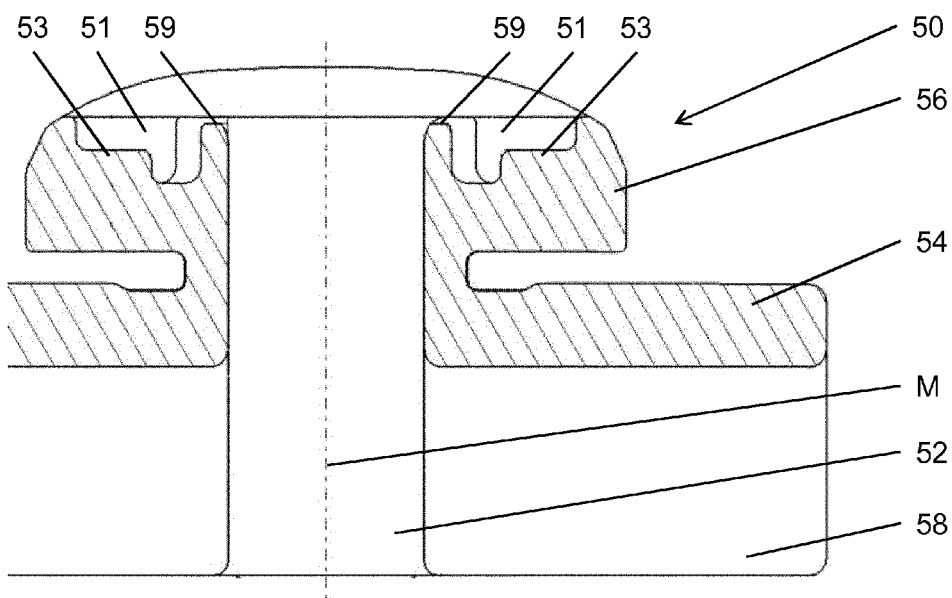
FIG. 8 is a cross sectional view through a slider along the line A-A in FIG. 7.

Referring to the drawings in particular, a vehicle seat 1 for a utility vehicle has a scissors-type stand 3, which comprises a lower frame 5, an upper frame 7 arranged above the latter, and, on both sides, a respective pair of intersected first rockers 8a and second rockers 8b. A transverse tube 9 connects the two intersections and at the same time defines a scissors axis about which the rockers 8a and 8b can pivot relative to each other.

The arrangement of the vehicle seat 1, inside the vehicle and the usual direction of travel of the latter, defines the directional information used below. A direction oriented perpendicular to the ground is designated below as the vertical direction, and a direction perpendicular to the vertical direction and perpendicular to the direction of travel is designated below as the transverse direction.

The first rockers 8a are connected to each other at their rear ends by means of a holding tube 18 and are articulated on the upper frame 7. At their front ends, the first rockers 8a are connected by means of a bearing tube 20 and are guided movably on both sides, by means of a respective bearing device 21 in the lower frame 5, in the longitudinal direction, which corresponds approximately to the direction of travel.

The second rockers 8b are connected to each other at their rear ends by means of a holding tube 18 and are articulated on the lower frame 5. At their front ends, the second rockers 8b are likewise connected by means of a bearing tube 20 and are guided movably on both sides, by means of a respective bearing device 21 in the upper frame 7, in the longitudinal direction.

The transverse tube 9, the bearing tubes 20 and the holding tubes 18 extend in the present case in the transverse direction, likewise the scissors axis. By means of a pivoting movement of the first rockers 8a relative to the second rockers 8b about the scissors axis, the height of the upper frame 7 over the lower frame 5, referred to below for short as height of the scissors-type stand 3, is modified. By means of a pneumatic spring 12 and preferably a damper (not shown here), the scissors-type stand 3 becomes an oscillating system, which greatly increases the seat comfort.

The vehicle seat 1 also has a seat frame 6 which, on the one hand in its rear area, is articulated on the upper frame 7 on both sides and, on the other hand in its front area, can be raised and lowered by means of an inclination adjuster and is thus adjustable in terms of its inclination relative to the scissors-type stand 3.

The vehicle seat 1 also has a backrest 10 which, in the present case, is mounted adjustably in inclination on the seat frame 6. Alternatively, the backrest 10 can also be mounted on the upper frame 7. A headrest 40 is provided in what is, in the vertical direction, an upper area of the backrest 10. The backrest 10 and the seat frame 6, which carries a seat shell 4 with a seat cushion 26, form a seat part 2. The backrest 10 and the seat cushion 26 are upholstered with a foam part and lined with a cover.

Together with the scissors-type stand 3, the seat part 2 is displaceable by means of two pairs of rails, whereby the vehicle seat 1 is adjustable in translation in the longitudinal direction, which corresponds approximately to the direction of travel. The two pairs of rails are offset in relation to each other in the transverse direction and are arranged parallel to each other. The two pairs of rails are of substantially identical construction.

Each pair of rails comprises a first seat rail 45, which is also designated as upper rail, and a second seat rail 46, which is also designated as lower rail. The second seat rail 46 is in the present case rigidly connected to the structure of the vehicle, and the first seat rail 45 is rigidly connected to the lower frame 5 of the vehicle seat 1. Alternatively, it is conceivable to connect the second seat rail 46 to the structure of the vehicle by means of an adapter or a console. It is also conceivable to connect the first seat rail 45 to the lower frame 5 of the vehicle seat 1 by means of an adapter.

The first seat rail 45 is guided movably relative to and within the second seat rail 46. By means of a locking device, the first seat rail 45 can be locked with the second seat rail 46. An unlocking unit, which comprises an unlocking bar 44, serves to unlock the locking device.

The unlocking bar 44 is arranged in what is a front area of the vehicle seat 1 as seen in the direction of travel, or the longitudinal direction, and is mounted pivotably about a pivot axle, which in the present case extends in the transverse direction. By pulling the unlocking bar 44 upward in the vertical direction, it is pivoted about the pivot axle, as a result of which the locking device is unlocked.

The unlocking lever 44 and the pivot axle are assigned kinematically to the lower frame 5 and to the first seat rail 45. This means that, during a displacement of the seat part 2 in the longitudinal direction, the unlocking lever 44 accordingly moves along too, but not in the case of a change of height of the scissors-type stand 3, i.e. during a movement of the seat part 2 in the vertical direction.

Those parts of the upper frame 7 and of the lower frame 5 that extend in the longitudinal direction each have a C-shaped profile open toward the interior of the vehicle seat 1. Each bearing device 21 has a load roller 14, which is mounted rotatably about a bearing axle extending in the transverse direction and which protrudes into an open C-shaped profile of the upper frame 7 or of the lower frame 5.

The C-shaped profile of the upper frame 7 and the C-shaped profile of the lower frame each have an upper limb 30 and a lower limb 32, which is arranged underneath the upper limb 30 in the vertical direction. The upper limb 30 and the lower limb 32 extend parallel to each other, and they are connected to each other by a base limb 34 extending at right angles to them. Thus, the upper limb 30, the lower limb 32 and the base limb 34 form a C-shaped profile in cross section.

The seat shell 4, which carries the seat cushion 26, is mounted movably in the longitudinal direction on the seat frame 6. For this purpose, several sliders 50 are provided which are connected rigidly to the seat frame 6. Each slider 50 protrudes, with a head-shaped connection area 56, through a respective guide slot 60 arranged in the seat shell 4 and extending in the longitudinal direction. Four identical sliders 50 are provided in the present case, and therefore only one slider 50 will be referred to below.

The seat shell 4 is mounted on the slider 50 in a manner known per se, namely by the guide slot 60 in the seat shell 4 being positioned with a widened insertion area 62 over the slider secured on the seat frame 6, and by the seat shell 4 being pushed rearward relative to the seat frame 6 in the longitudinal direction. In this way, the edges of the guide slot 60 come into contact with the undercut connection area 56 of the slider 50. A linear slotted guide is thus obtained here.

By means of an adjustment device (not shown), the seat shell 4 is displaceable in the longitudinal direction and fixable in a chosen position. By displacement of the seat shell 4 relative to the seat frame 6 in the longitudinal direction, the seat depth of the vehicle seat 1, i.e. the length of the seat surface located in front of the backrest 10 in the direction of travel, is adjustable.

The seat frame 6 has a non-circular central opening 64, formed here by the superposition of a circular inner area and of a rectangular area of greater length and smaller width than the diameter of the circular inner area, wherein the narrow sides of the rectangle have an outwardly curved shape. The central opening 64 thus has approximately the shape of a keyhole for a key with two key bits. A central axis M is defined by a straight line through the center of the circle, perpendicular to the seat frame 6, and extends approximately in the vertical direction. The center of the circle coincides with the center point of the rectangle.

Two slightly elongate secondary openings 66 are provided perpendicularly with respect to the arrangement of the central longitudinal axis of the rectangle, which here extends approximately in the longitudinal direction, and farther away from the central axis M, wherein the longitudinal extent of the elongate secondary openings 66 is oriented in the radial direction relative to the central axis M. Thus, in the present case, the secondary openings 66 are offset approximately in the transverse direction with respect to the central opening 64.

Alternatively, the central longitudinal axis of the rectangle can also extend in the transverse direction or at any desired angle to the transverse direction and to the longitudinal direction. Similarly, the secondary openings 66 can also be offset in the longitudinal direction or in any desired other direction with respect to the central opening 64.

The slider 50 is here produced in one piece from plastic and has a central area 54, which has a substantially cuboid shape. Several ribs 58 are formed on the underside of the central area 54 facing toward the seat frame 6, transversely with respect to the longitudinal extent of the cuboid. The head-shaped connection area 56 is formed on the upper side of the central area 54 facing toward the seat shell 4.

Moreover, two spring arms 57, extending outward approximately horizontally and in opposite directions, are provided on the underside facing toward the seat frame 6, said spring arms 57 each having, at their outer free end, a projection 55 which points downward away from the central area 54 and which narrows slightly in a frustoconical shape.

Moreover, the slider 50 has a through-opening 52 extending through the connection area 56 and through the central area 54. The through-opening 52 has an approximately rectangular cross section and extends coaxially with respect to the central axis M of the central opening 64.

The connection area 56 in this case has four recesses 51, which are each separated from the centrally arranged through-opening 52 by a respective support area 59. A web 53 extending upward in the vertical direction is provided inside each recess 51.

An anchoring element 70, here made of metal, is fitted concentrically into the through-opening 52 of the slider 50 and passes through the latter in the direction of the central axis M of the central opening 64. Here, the anchoring element 70 is designed in one piece as a zinc die-cast part.

At its end directed away from the seat frame 6, the anchoring element 70 has a plate-shaped holding area 72, which has a cuboid shape and bears on the connection area 56 of the slider 50. On the side of the holding area 72 facing toward the slider 50, four claws 73 are in this case provided, which jut out from the otherwise planar surface of the holding area 72 in the direction of the connection area 56 of the slider 50. Here, the claws 73 are prism-shaped with a triangle as base, and with each boundary face adjoining the holding area 72.

The claws 73 of the holding area 72 lie adjacent to the support areas 59 of the slider 50 in the vertical direction and touch these. The support areas 59, like the whole slider 50, are made of a comparatively soft material, in the present case plastic. The claws 73, made of metal, can therefore penetrate into the surfaces of the support areas 59 and deform them.

The claws 73 penetrate to a greater or lesser depth into the support areas 59 depending on production-related deviations in the extent of the support areas 59 and of the claws 73 in the vertical direction. It is thereby possible to compensate for production-related tolerances of the slider 50 and of the anchoring element 70. The claws 73 penetrate into the support areas 59 in such a way that the longitudinal axis of the anchoring element 70 is flush with the central axis M.

Adjoining the holding area 72 in the axial direction with respect to the central axis M, the anchoring element 70 has a main body 74, which likewise has a cuboid shape. In the cross section perpendicular to the central axis M, the shape of the main body 74 corresponds approximately to the cross section of the through-opening 52 of the slider 50.

Adjoining the main body 74 in the axial direction and facing away from the holding area 72, the anchoring element 70 has an intermediate area 76, which is approximately circular in cross section. The diameter of the cross section of the intermediate area 76 corresponds approximately to the diameter of the circular inner area of the central opening 64 in the seat frame 6.

The axial length of the main body 74 corresponds approximately to the axial extent of the slider 50. The axial length of the intermediate area 76 corresponds approximately to the thickness of the seat frame 6.

Moreover, the anchoring element comprises a securing area 78, which is directed axially away from the holding area 72 and adjoins the intermediate area 76. The securing area 78 has a substantially cuboid shape and is thus approximately rectangular in cross section. The dimensions of this rectangular cross section correspond approximately to the dimensions of the rectangular area of the central opening 64 in the seat frame 6.

The way in which the slider 50 is mounted, with the aid of the anchoring element 70, in the seat frame 6 of the vehicle seat 1 is now described. First of all, with its securing area 78 to the front, the anchoring element 70 is inserted axially with respect to the central axis M into the through-opening 52 of the slider 50, until the holding area 72 of the anchoring element 70 lies flush on the connection area 56 of the slider 50.

The claws 73 of the anchoring element 70 thereby come into contact with the support areas 59 of the slider 50 and embed themselves in said support areas, i.e. deform them plastically. The claws 73 embed themselves in the support areas 59 to a greater or lesser depth, depending on the extent of the support areas 59 and of the claws 73 in the vertical direction, as a result of which it is possible to compensate for production-related tolerances of the anchoring element 70 and of the slider 50.

In this way, a form-fit and force-fit connection between the slider 50 and the anchoring element 70 is obtained. The claws 73 then lie vertically opposite a respective web 53 of the slider 50 but remain spaced apart therefrom.

If, in the event of a crash, a deformation of the slider 50 takes place, one or more webs 53 can come into contact against the respectively opposite claw 73 of the anchoring element 70.

The securing area 78 of the anchoring element 70 is then inserted axially through the central opening 64 of the seat frame 6. The anchoring element 70 is oriented in such a way that the securing area 78 fits through the rectangular area of the central opening 64. The slider 50 is oriented in such a way that the projections 55, with respect to the central axis M, lie offset by approximately 90° with respect to the secondary openings 66. The securing area 78 of the anchoring element 70 is thus located on the side of the seat frame 6 directed away from the slider 50.

The anchoring element 70, together with the slider 50, is thereafter rotated through 90° about the central axis M. In this way, the projections 55 of the slider 50 position themselves over the secondary openings 66 and are pressed by the spring arms 57 into these secondary openings 66, where they latch with a form fit. Moreover, the securing area 78 of the anchoring element 70 is positioned partially under the seat frame 6 and thus secures the anchoring element 70 and the slider 50 in the axial direction.

The slider 50 is thus connected with a form fit to the seat frame 6.

According to an alternative embodiment, the anchoring element 70 is designed as a rivet, preferably as a steel blind rivet, which connects the slider 50 to the seat frame 6.

While specific embodiments of the invention have been shown and described in detail to illustrate the application of the principles of the invention, it will be understood that the invention may be embodied otherwise without departing from such principles.

The invention claimed is:

1. A vehicle seat comprising:
 a first seat part;
 a second seat part which is displaceable in the longitudinal direction relative to the first seat part in order to adjust a seat depth;
 at least one slider connected to the first seat part and having a head-shaped connection area protruding through a guide slot provided in the second seat part; and
 an anchoring element securing the slider on the first seat part, the anchoring element comprising a separate part made of metal, the anchoring element protruding through the slider and through the first seat part and establishing a form-fit connection of the slider to the first seat part, the anchoring element having a plate-shaped holding area, bearing on the connection area of the slider, wherein at least one claw is provided on the holding area, which claw deforms at least one support area of the slider plastically.

2. The vehicle seat as claimed in claim 1, wherein the first seat part is a seat frame connected to an upper frame or to a scissors-type stand of the vehicle seat.

3. The vehicle seat as claimed in claim 1, wherein the second seat part is a seat shell, which carries a seat cushion.

4. The vehicle seat as claimed in claim 1, wherein the anchoring element is designed in one piece.

5. The vehicle seat as claimed in claim 1, wherein the slider is made of plastic.

6. The vehicle seat as claimed in claim 1, wherein the anchoring element is designed as a zinc die-cast part.

7. The vehicle seat as claimed in claim 1, wherein the connection area has a through-opening into which the anchoring element is fitted, wherein several support areas are arranged around the through-opening.

8. The vehicle seat as claimed in claim 7, wherein several claws are arranged on the holding area in such a way that each of the claws deforms one of the support areas.

9. The vehicle seat as claimed in claim 1, wherein the anchoring element has a securing area, which is inserted through a central opening in the first seat part and interacts with the first seat part.

10. The vehicle seat as claimed in claim 9, wherein the securing area has a cuboid shape.

11. The vehicle seat as claimed in claim 1, wherein the form-fit connection of the slider to the first seat part can be established by rotating the anchoring element through approximately 90° relative to the first seat part.

* * * * *